United States Patent [19]

Hayashi

[11] Patent Number: 4,789,808
[45] Date of Patent: Dec. 6, 1988

[54] GYROTRON DEVICE WITH ADJUSTABLE PITCH FACTOR

[75] Inventor: Kenichi Hayashi, Yokohama, Japan
[73] Assignee: Toshiba Kabushiki Kaisha, Tokyo, Japan
[21] Appl. No.: 866,253
[22] Filed: May 23, 1986
[51] Int. Cl.⁴ ............................................. H01J 25/00
[52] U.S. Cl. ........................................ 315/4; 372/2; 331/94.1; 315/5
[58] Field of Search ...................... 315/3, 4, 5; 372/2; 331/94.1

[56] References Cited

U.S. PATENT DOCUMENTS

| | | | |
|---|---|---|---|
| 3,398,376 | 8/1968 | Hirshfield | 315/5 X |
| 3,463,959 | 8/1969 | Jory et al. | 315/5 |
| 4,224,576 | 9/1980 | Granatstein et al. | 315/5 |
| 4,393,332 | 7/1983 | Symons | 315/4 |
| 4,506,190 | 3/1985 | Symons | 315/5 |
| 4,513,223 | 4/1985 | Chodorow | 315/5 |

OTHER PUBLICATIONS

Chu, et al., "Methods of Efficiency Enhancement and Scaling for the Gyrotron Oscillator", IEE Transactions on Microwave Theory and Techniques, vol. MTT—28, No. 4, Apr. 1980.
Jory, et al., "Grytron Oscillators for Fusion Heating", Symposium on Heating in Toroidal Plasmas, Grenoble, Mar. 1982.

*Primary Examiner*—Saxfield Chatmon
*Attorney, Agent, or Firm*—Banner, Birch, McKie & Beckett

[57] ABSTRACT

In gyrotron devices, pitch factor and efficiency are directly proportional. When the pitch factor is increased, however, a larger starting current is needed. The available power supply thus limits the pitch factor and subsequently, the efficiency of the device. The present invention is a gyrotron device in which the pitch factor is adjustable. When starting the gyrotron the pitch factor is set to a low level and only a small starting current is required. After the device has been started, the pitch factor can be increased to increase the oscillation efficiency.

6 Claims, 6 Drawing Sheets

1

GYROTRON DEVICE WITH ADJUSTABLE PITCH FACTOR

BACKGROUND OF THE INVENTION

This invention relates to electromagnetic wave generators for achieving very high frequency and high power. More particularly, it relates to a gyrotron device for generating a linear beam of electrons. Gyrotron devices are frequently used for injecting a high power electromagnetic wave into a nuclear fusion reactor in order to heat the plasma to reach the fusion ignition temperature.

FIG. 1 shows a well known gyrotron device. The gyrotron device comprises an electron gun 10 for emitting an electron beam in the direction of a dielectric window 51, a magnetic coil 22 for giving a cyclotron movement to the electrons, a resonator 30 for resonating the electromagnetic wave generated from the electron beam, and an output section for transmitting the electromagnetic wave through the window 51. The electron gun 10 comprises a conically tapered thermionic cathode 11 with an emitter 14 which is heated by a radiant internal heater 15. Surrounding cathode 11 is control electrode 12, and surrounding electrode 12 is solenoid 21 which produces an axial magnetic field. The heater 15 is energized by a power supply 17 through a terminal lead 16. Cathode 11 is connected to a D.C. power supply 80 which comprises a D.C. voltage generator 81 and dividing resistors 82, 83. The divided voltage is supplied to the control electrode 12. Each of the electrodes 11, 12, and 13 are insulated by insulators 71, 72.

Electron gun 10 emits a hollow electron beam which is drawn by a positive potential into the main body 20 of the gyrotron. The electrons travel in a helical pattern, thus creating a beam which rotates about its own axis as it travels in the gyrotron. An axial magnetic field formed by the magnetic coil 22 increases greatly as the electron stream passes into the entrance area of anode 13. The electron beam is compressed in diameter due to the effects of this magnetic field. Also, the speed of rotation about its axis is increased while its axial velocity is decreased. Axial energy is thereby converted into rotational energy. After the beam is compressed, it enters the interaction cavity 30. This is a circularly symmetric cavity with high-conductivity walls of copper. The cavity 30 is dimensioned to be electro-magnetically resonant in a mode with the circular electric field perpendicular to its axis. At the beam input end, the wall of cavity 30 is constricted to form an aperture of a diameter small enough to prevent transmission of the cavity wave with consequent loss of energy. At the beam output end a similar aperture (second neck portion) is not completely cut off for the wave, but allows the desired fraction to emerge through the dielectric vacuum window 51 to enter a useful load (not shown) connected to an output micro-wave guide 52. Interaction cavity 30 is tapered larger in diameter toward its output end so that the amplitude of the standing wave increase for cumulative interaction.

After leaving cavity 30, the beam enters a region of decreasing magnetic field strength and its diameter increases accordingly until it is collected on the outer wall of propagating waveguide 42 which is cooled by water channels 44. Thus the functions of beam collector and output waveguide are combined.

In order to obtain a high oscillation efficiency, the ratio of the orbital velocity of the electron beam ($V_0$) to the longitudinal velocity ($V_1$) must be high. This ratio is know as the pitch factor. When the pitch factor is high, however, a large starting current must be used, which requires a large power source. If the size of the power source is limited, a lower pitch factor must be used which will result in a reduced oscillation efficiency.

SUMMARY OF THE INVENTION

The principal object of the present invention is to provide an improved high efficiency gyrotron device.

An important object of the present invention is to produce a gyrotron device which can be easily started with a relatively low starting current.

Another object of the present invention is to produce an electron beam with a high pitch factor.

According to the invention, a gyrotron device is constructed which has the capability of adjusting the pitch factor of the generated electron beam. In this manner, the pitch factor can be set relatively low when starting the device, thus requiring a low starting current. Once the device is operating, the pitch factor can be increased to provide high oscillation efficiency.

DETAILED DESCRIPTION OF THE PREFERRED EMBODIMENTS

Figure 1:
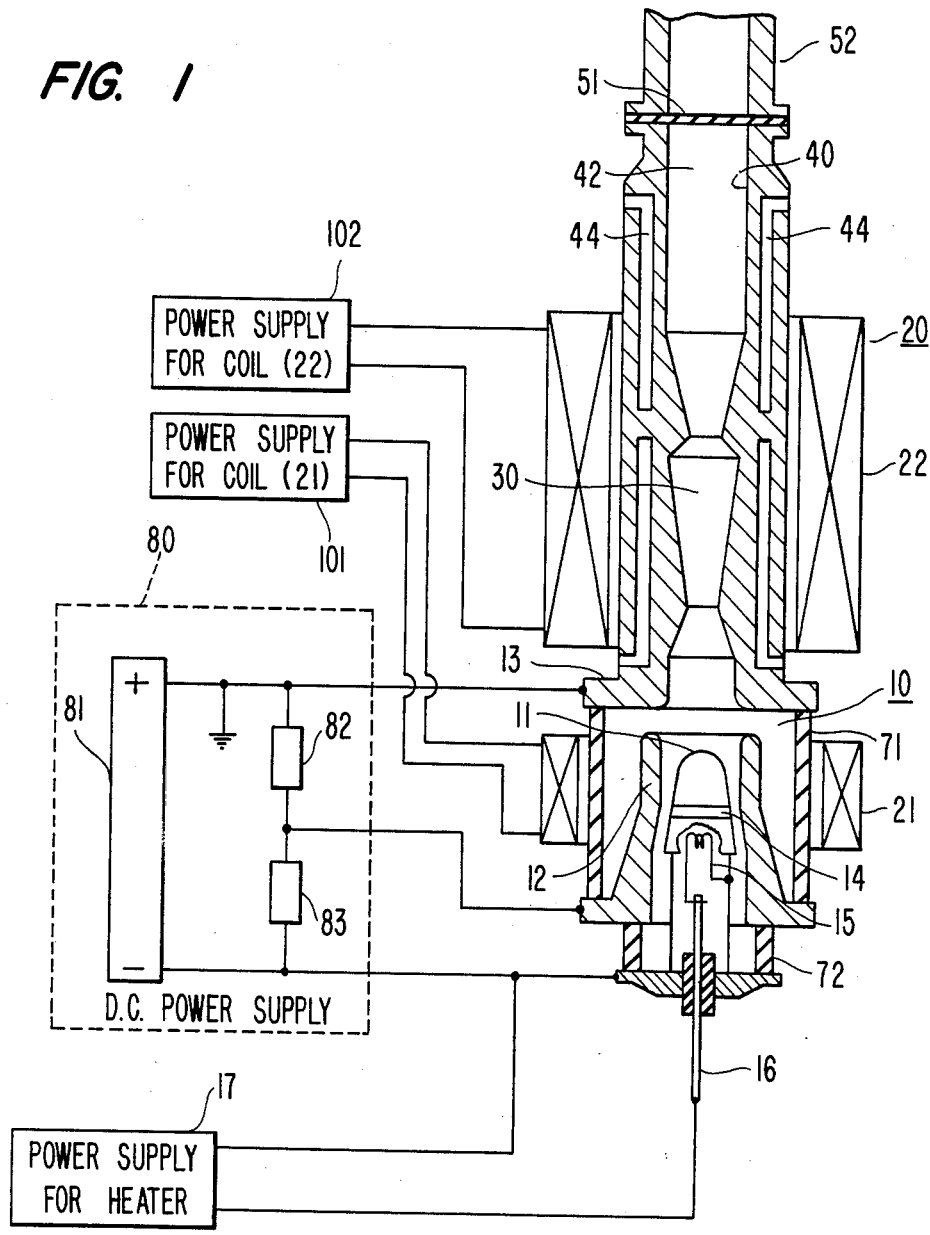
FIG. 1 is a schematic axial view of the prior art gyrotron.
Figure 2:
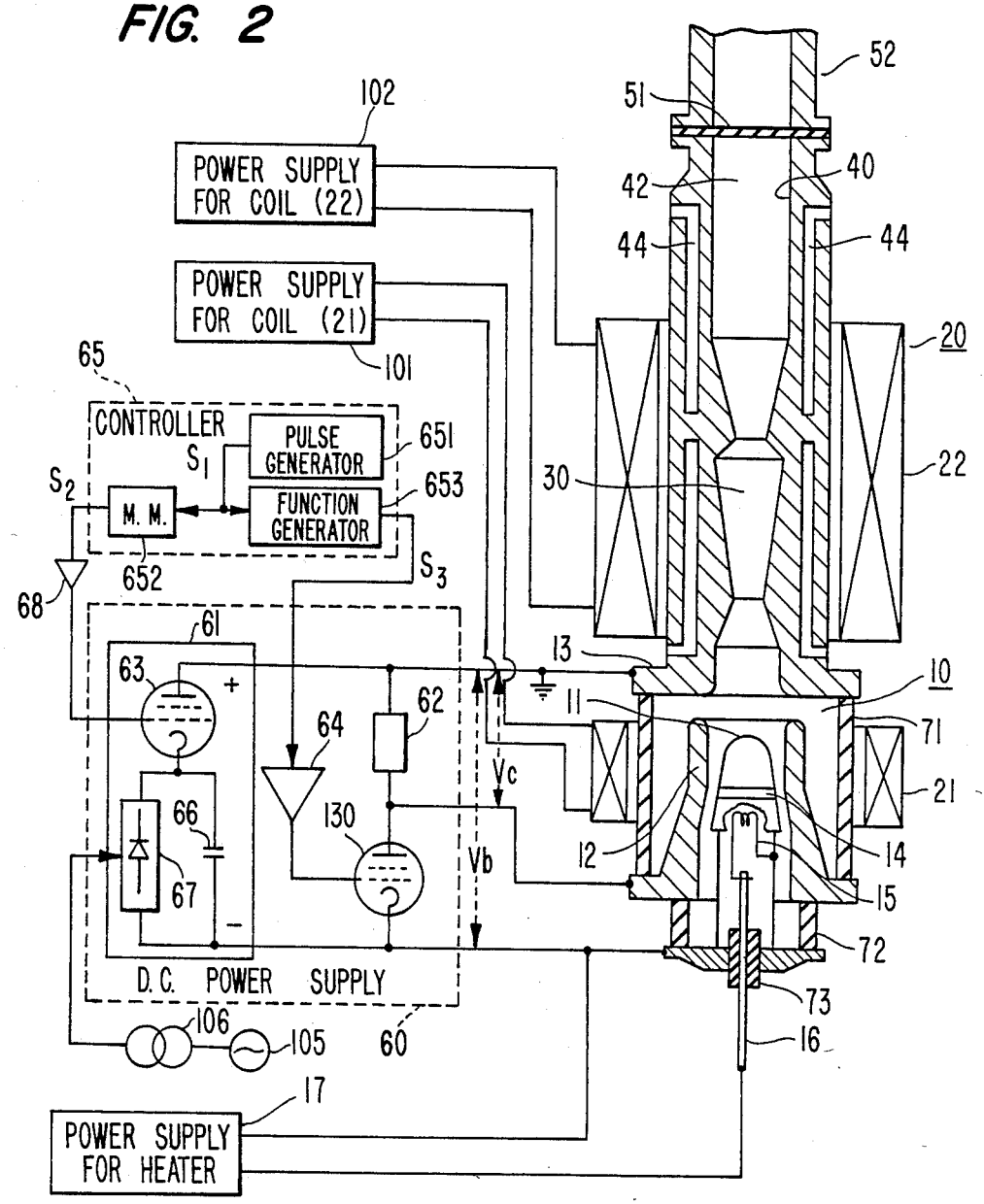
FIG. 2 is an axial view of a gyrotron and its circuit construction of the present invention.

A first embodiment of a gyrotron device according to the present invention is shown in FIG. 2. This device is an improvement over the prior art device shown in FIG. 1 and corresponding parts are numbered similarly. A D.C. power supply 60 is connected to electrodes 11, 12, and 13 of the electron gun 10. The power supply 60 can supply a variable voltage between the cathode 11 and control electrode 12. The power supply 60 comprises a D.C. voltage generator 61, a resistor 62, a vacuum tube 130, and driver circuit 64. The D.C. voltage generator 61 comprises a vacuum tube 63 and a rectifier circuit provided with a capacitor 66 and a rectifier 67 which is connected to an A.C. source 105 through a transformer 106. One output terminal of the D.C. voltage generator 61 is connected to electrode 13 and to one side terminal of the resistor 62 with the other output being connected to cathode 11 and to the cathode of vacuum tube 130. The other side terminal of the resistor 62 is connected to an anode of the vacuum tube 130 and to the control electrode 12 of the electron gun 10. Power supply 60 is controlled by controller 65 which comprises a pulse generator 651 generating a starting signal $S_1$, a mono-multi vibrator 652 operated by the starting signal $S_1$ and outputting a signal $S_2$, and a function generator 653 generating a control signal $S_3$ and also operated by signal $S_1$. The signal $S_2$ is connected to a grid of the vacuum tube 63 through a driver circuit 68. The control signal S3 is connected to a control grid of the vacuum tube 130 through the driver circuit 64. The voltage on electrode 12 is controlled by changing the impedance of vacuum tube 130.

As mentioned above, the pitch factor (non unit) depends upon two components of the electron velocity ($V_0$ and $V_1$). The orbital velocity $V_0$ is proportional to an electrostatic field Ek and an electromagnetic field Bk according to the follow equation:

$$V_o \propto (Ek/Bk)$$

The pitch factor varies, therefore, by changing the electrostatic field Ek or the electromagnetic field Bk. The present embodiment changes the value of Ek which is equal to the difference voltage, $|Vb|-|Vc|$, between the voltage Vb (beam voltage) supplied to cathode 11 and the control voltage Vc supplied to electrode 12 divided by the distance d between the cathode emitter 14 and control electrode 12. Therefore:

$$Ek = (|Vb|-|Vc|)/d$$

The pitch factor of the electron beam can therefore be changed by changing the value of the voltage, $|Vb|-|Vc|$, supplying the control electrode 12.

Figure 3:
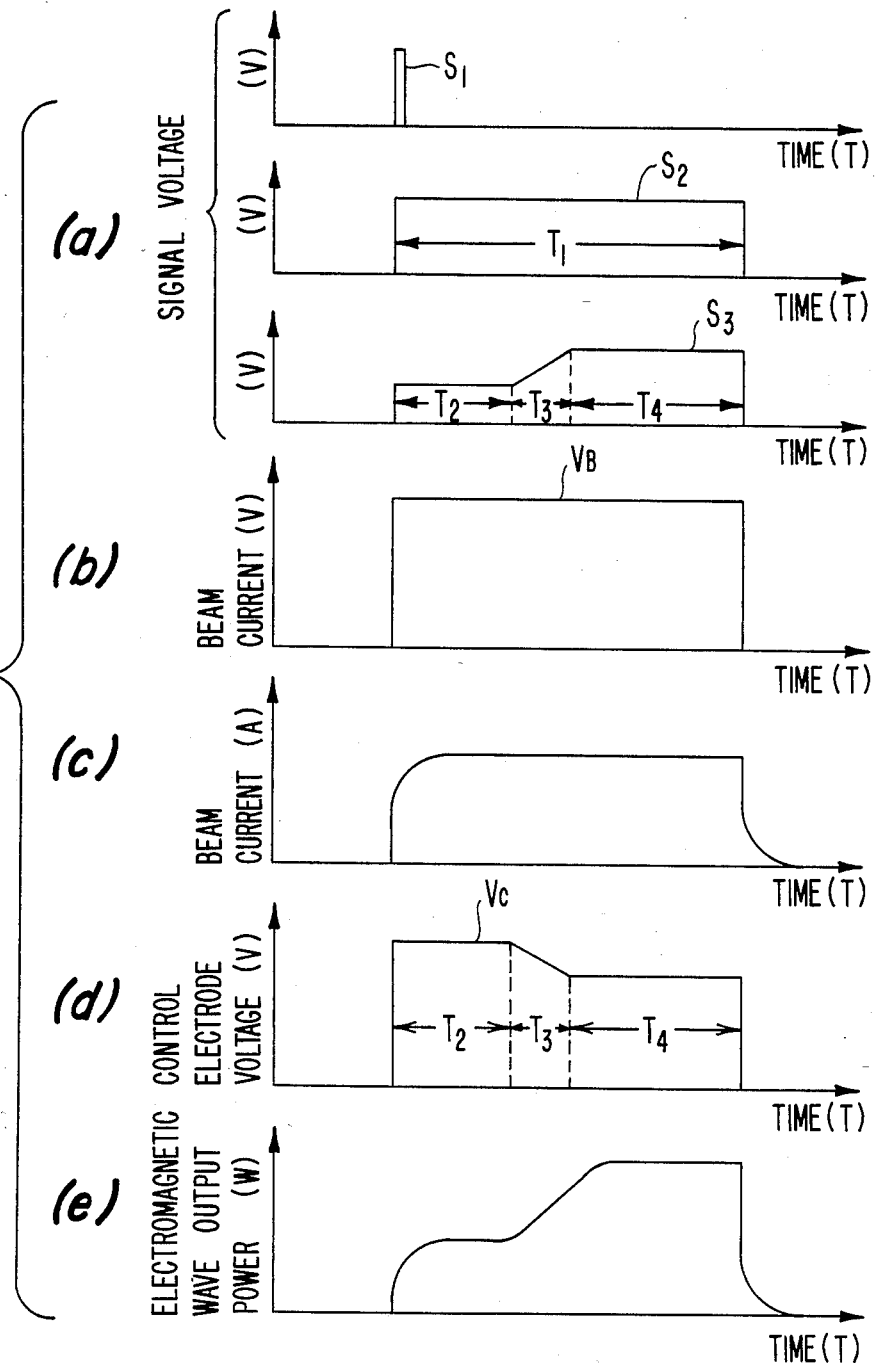
FIG. 3 shows various electrical parameters of the present invention plotted against time.

FIG. 3 illustrates how the present invention operates. Signals $S_1$, $S_2$ and $S_3$ are plotted against time in FIG. 3(a). The beam voltage Vb is illustrated in FIG. 3(b), while the beam current is shown in FIG. 3(c). The control voltage Vc is illustrated in FIG. 3(d). The beam current (an anode current of the electron gun 10) flows during $T_1$ as shown in FIG. 3(c). The control electrode voltage Vc is controlled from a higher voltage level during time $T_2$ to a lower voltage level during time $T_4$. The voltage Vc changes during time $T_3$. The electromagnetic wave output power that is generated is shown in FIG. 3(e).

When Vc is at the higher level, i.e., during time $T_2$, the pitch factor is small and a low starting current is sufficient to begin operation. Vc is then gradually reduced over time $T_3$ to a lower level during time $T_4$. This lower level results in an increased pitch factor which increases the oscillation efficiency.

Figure 4:
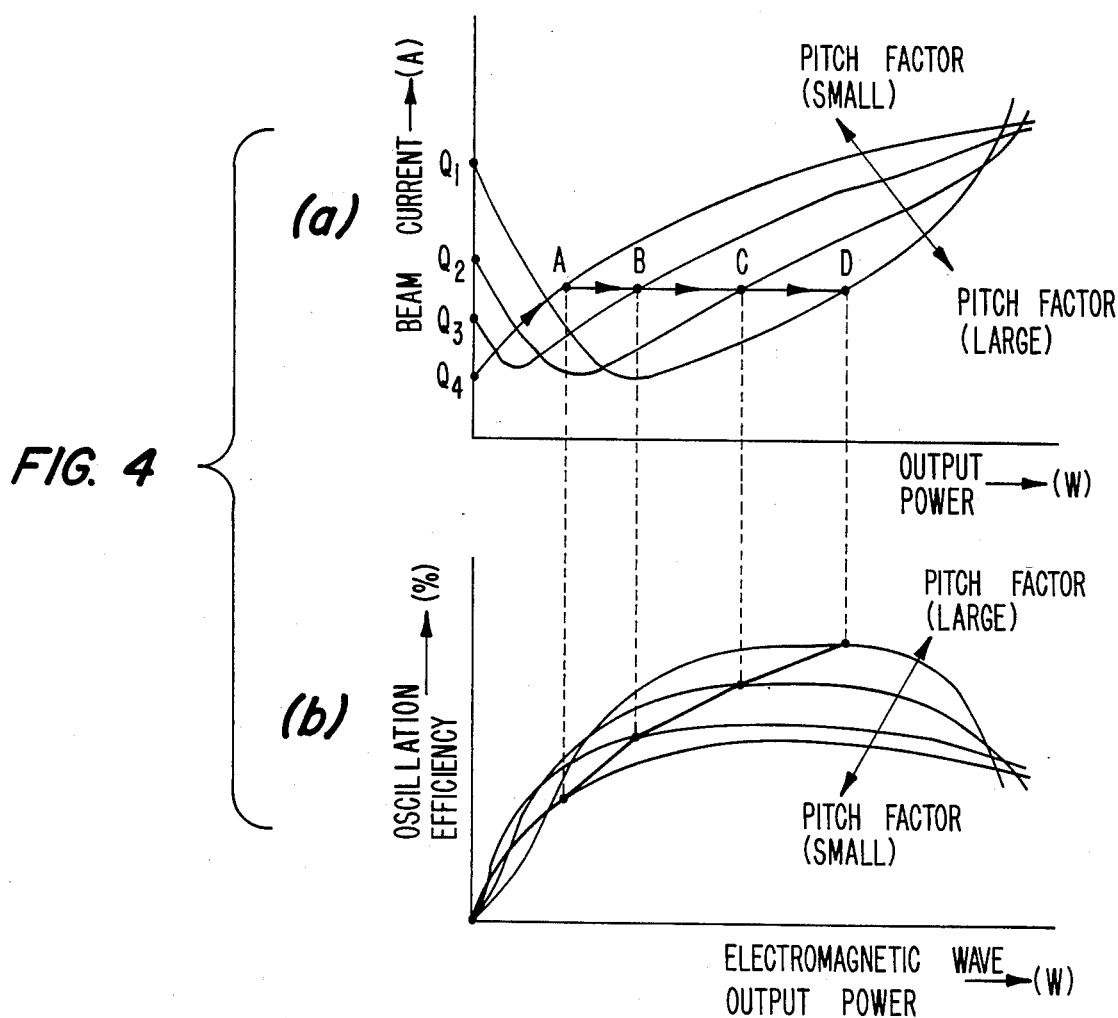
FIG. 4 is a graph of the beam current and a graph of the oscillation efficiency vs. electromagnetic wave output power.

FIG. 4 illustrates the relationship between beam current and output power and between oscillation efficiency and output power. The parameter used is the pitch factor of the electron beam. Points Q1 to Q4 show various oscillation starting current values which occur when the output power is zero. By use of controller 65, the pitch factor is first set to a small value. The oscillation may then be started at a small current (for example at point Q4). Starting is easy, but efficiency is low. In order to improve efficiency the pitch factory is increased by continuously decreasing the voltage supplied to the control electrode 12 of the electron gun 10. The operation point moves from a point A through points B and C to point D. At point D, a high oscillation efficiency is achieved without having had to supply a large starting current, i.e., the current represented by Q1.

Figure 5:
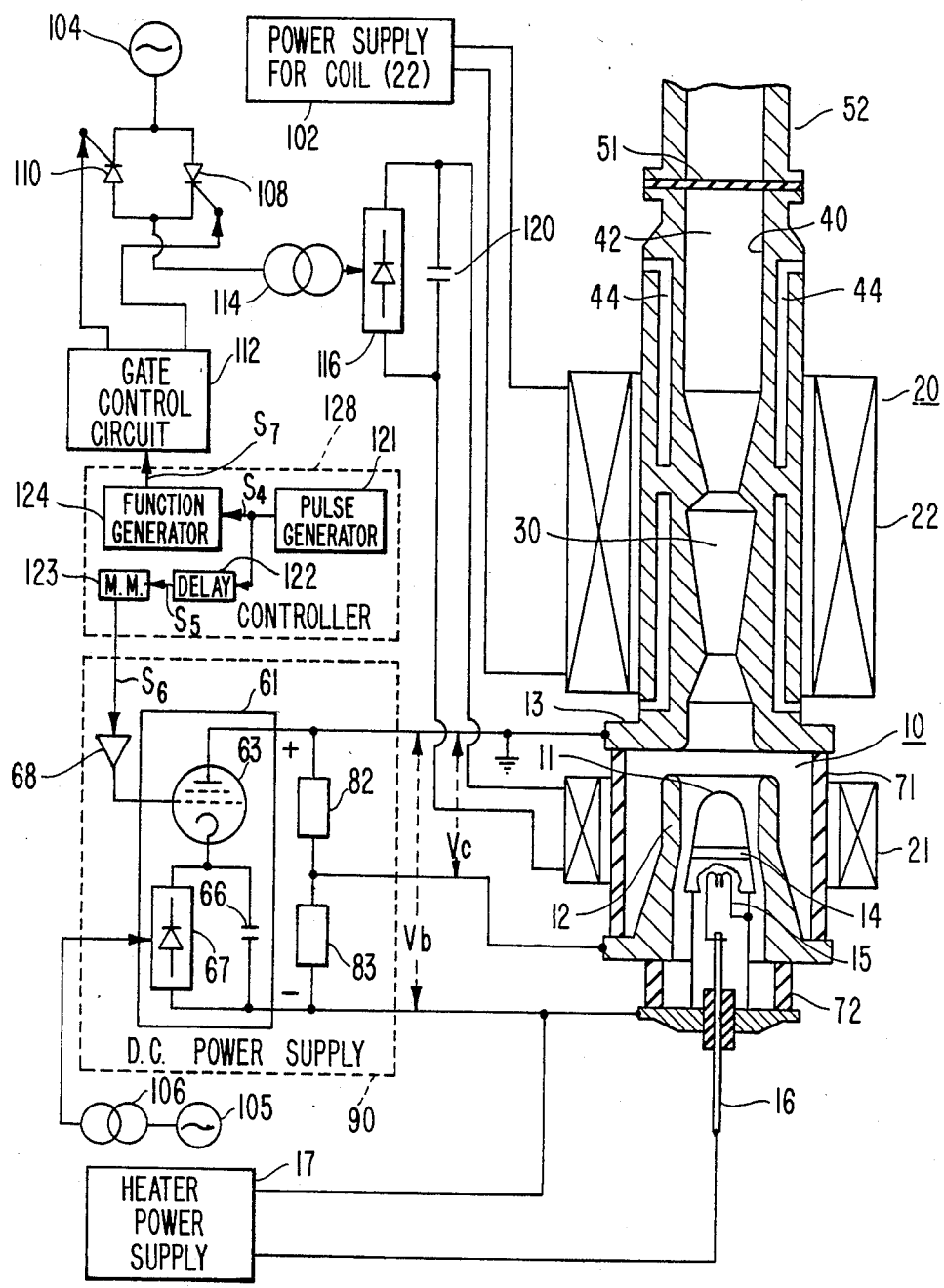
FIG. 5 shows a second embodiment of the present invention.

FIG. 5 is a schematic of a gyrotron device employing a somewhat different approach to the same problem. In this embodiment the pitch factor is adjusted by controlling the magnetic field Bk. The control means of magnetic field Bk comprises a pair of controlled rectifiers 108, 110 controlling an A.C. source 104 by a gate control circuit 112. Gate control circuit 112 is connected to a controller 128. Rectifier 116 is connected to controlled rectifiers 108 and 110 by transformer 114 and is also connected to a capacitor 120 and to coil 21. Transformer 114 supplies an exciting voltage to the rectifier 116. The controller 128 comprises a pulse generator 121 which outputs a starting signal $S_4$, a delay circuit 122 which receives the starting signal $S_5$, a mono-multivibrator (M.M.) 123 which outputs a signal $S_6$ and a function generator 124 generating a signal $S_7$. The output of the M.M. is supplied to the gate of vacuum tube 63 through the gate driver 68 for on-off switching of the D.C. source in the D.C. power supply 90.

Figure 6:
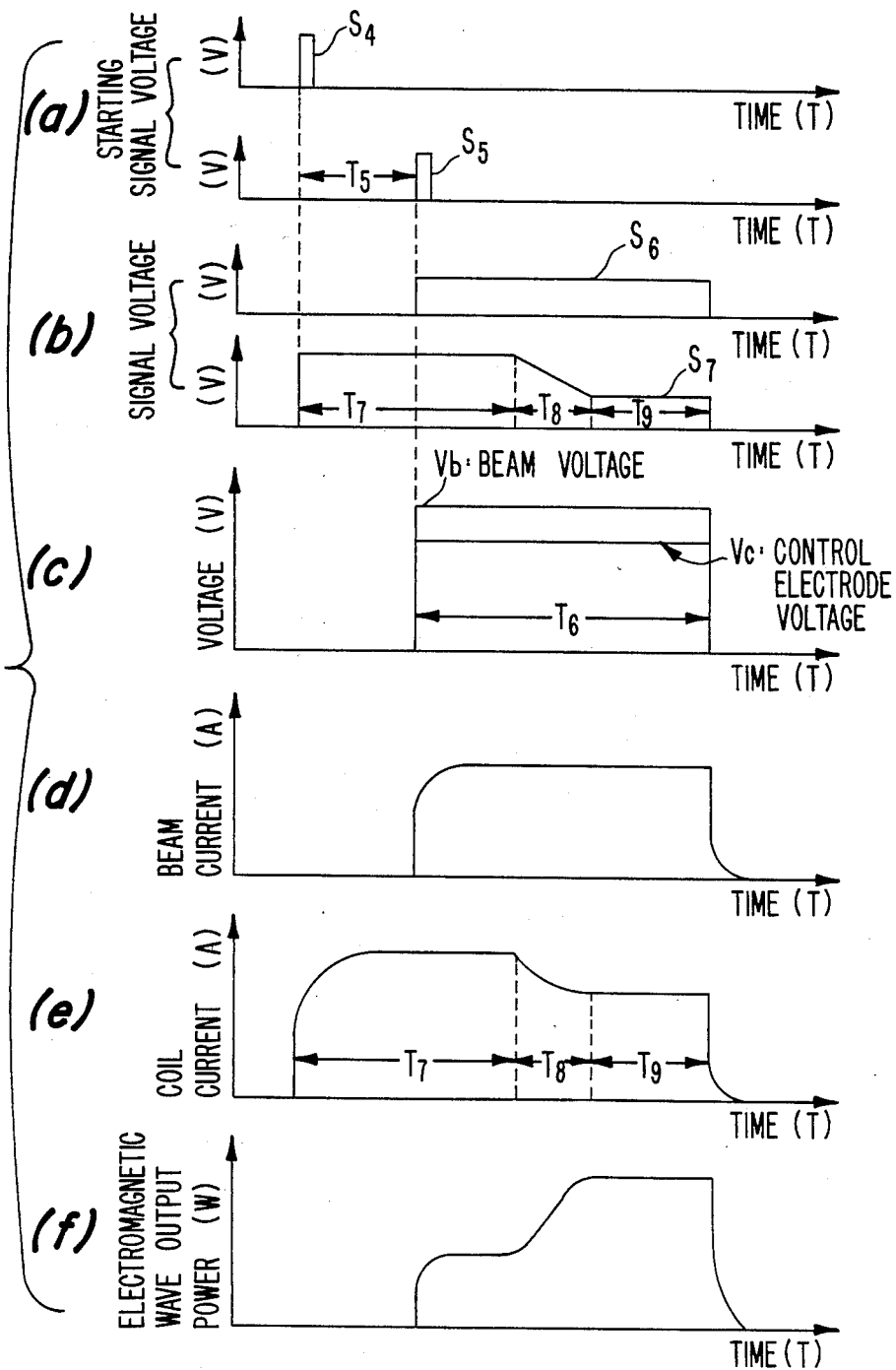
FIG. 6 shows various electrical parameters of the embodiment depicted in FIG. 5 plotted against time.

The operation of this embodiment is illustrated in FIG. 6. The current in coil 21 is shown in FIG. 6(e) and begins with starting signal $S_4$ (shown in FIG. 6(a)). The coil current is controlled by signal $S_7$ created by function generator 124 and depicted in FIG. 6(b). The beam current (shown in FIG. 6(d)) and electromagnetic wave output power (shown in FIG. 6(f)) are both initiated by signal $S_5$, which lags $S_4$ by time $T_5$. The beam voltage Vb and the control electrode voltage Vc are both supplied during time $T_6$ as shown in FIG. 6(c). The coil current is controlled from a higher level during time $T_7$ to a lower level during time $T_9$ by reducing it during period $T_8$. When the coil current is high, the pitch factor is low and an easy start is possible. Once started, the coil current is reduced to increase the efficiency of the device.

Whereas preferred embodiments of the invention have been illustrated and described herein, it is to be understood that these embodiments must be taken only as a preferred representation of the invention. Accordingly, various changes and modifications in the arrangement and configuration of the components, part, etc. may be resorted to without departing from the disclosure of the invention or the scope of the appended claims.

I claim:

1. A gyrotron device comprising:
an electron gun for producing a beam of electrons traveling along an axis;
an eletromagnetic field generator for generating an electromagnetic field which interacts with said beam and causes said beam to rotate about said axis; and
adjusting means for adjusting the pitch factor of said beam of electrons to a low level to effectuate easy starting of the gyrotron and to a higher level after starting to increase oscillation efficiency.

2. A gyrotron device according to claim 1 wherein said adjusting means adjusts the pitch factor of said electron beam to a low level to effectuate easy starting of the gryotron and increases the pitch factor thereafter to increase oscillation efficiency.

3. A gyrotron device according to claim 1 wherein said adjusting means comprises a variable voltage supply.

4. A gyrotron device according to claim 3 wherein said variable voltage supply is connected to an electrode of said electron gun.

5. A gyrotron device according to claim 4 wherein said variable voltage device comprises a voltage generator connected in series with a vacuum tube and a resistor such that a voltage generated by said voltage generator is divided across said vacuum tube and said resistor.

6. A gyrotron device according to claim 1 wherein said adjusting means comprises controlling means for controlling the strength of said electromagnetic field.

* * * * *